(12) United States Patent
Enberg et al.

(10) Patent No.: US 12,053,891 B2
(45) Date of Patent: Aug. 6, 2024

(54) SYSTEM FOR OPTIMIZING ROBOT PERFORMANCE

(71) Applicant: ABB Schweiz AG, Baden (CH)

(72) Inventors: Markus Enberg, Västerås (SE); Tomas Groth, Västerås (SE)

(73) Assignee: ABB Schweiz AG, Baden (CH)

( * ) Notice: Subject to any disclaimer, the term of this patent is extended or adjusted under 35 U.S.C. 154(b) by 497 days.

(21) Appl. No.: 17/593,970

(22) PCT Filed: Apr. 5, 2019

(86) PCT No.: PCT/EP2019/058585
§ 371 (c)(1),
(2) Date: Sep. 29, 2021

(87) PCT Pub. No.: WO2020/200468
PCT Pub. Date: Oct. 8, 2020

(65) Prior Publication Data
US 2022/0184809 A1 Jun. 16, 2022

(51) Int. Cl.
*B25J 9/16* (2006.01)
*B23C 1/00* (2006.01)
*B60C 25/05* (2006.01)

(52) U.S. Cl.
CPC ........... *B25J 9/1671* (2013.01); *B23C 1/005* (2013.01); *B60C 25/0587* (2013.01)

(58) Field of Classification Search
CPC ..... B25J 9/1671; B60C 25/0587; B23C 1/005
See application file for complete search history.

(56) References Cited

U.S. PATENT DOCUMENTS

| | | | |
|---|---|---|---|
| 9,278,449 B1 | 3/2016 | Linnell et al. | |
| 9,375,841 B1 | 6/2016 | Kemper | |
| 9,895,803 B1 | 2/2018 | Oslund | |
| 2003/0171847 A1* | 9/2003 | Cheng | G05B 19/4103 318/568.11 |
| 2017/0364076 A1 | 12/2017 | Keshmiri et al. | |
| 2017/0372139 A1 | 12/2017 | Thomasson et al. | |
| 2018/0236657 A1* | 8/2018 | Kuwahara | B25J 9/1671 |
| 2019/0232492 A1* | 8/2019 | Takeuchi | B25J 9/16 |

OTHER PUBLICATIONS

International Search Report and Written Opinion of the International Searching Authority; Application No. PCT/EP2019/058585; Completed: Jan. 2, 2020; Mailing Date: Jan. 10, 2020; 14 Pages.

* cited by examiner

*Primary Examiner* — Behrang Badii
*Assistant Examiner* — Jay Khandpur
(74) *Attorney, Agent, or Firm* — Whitmyer IP Group LLC

(57) ABSTRACT

A system and a method, for assisting a user in programming a robot. Storage circuitry includes predefined possible values for a physical condition of at least two joints, the values being subdivided into two or more ranges. Processing circuitry is arranged to acquire a first path of the Tool Centre Point (TCP), receive, for each of a plurality of points of the first path and for the joints, a value associated with the physical condition at the respective points, determine which of the ranges the value is associated with, generate at least one additional path, associate each of the at least two joints to a respective path, and send instructions to a display, to illustrate the first path and the additional path, together with the information of which range the values are associated with at the plurality of points of the paths.

16 Claims, 4 Drawing Sheets

SYSTEM FOR OPTIMIZING ROBOT PERFORMANCE

TECHNICAL FIELD

The present invention relates to a system and a method for assisting a user in programming a robot comprising a plurality of joints and a Tool Centre Point (TCP).

BACKGROUND

When programming a robot, there are many kinds of visual aids that can be used for assisting the programmer to make it easier to see any problems in the programming that need to be taken care of.

For example, US20170372139 presents a simulation environment with graphical indicators over the joints, which may be a joint limit meter, that indicates how close each joint is to its physical limit.

U.S. Pat. No. 9,895,803B1 shows techniques for calculating trajectory corridors for robot end effectors and for selecting paths through the trajectory corridors based on various criteria. The presented method may include identifying a portion of the trajectory corridor that violates a kinematic constraint of the robot. The method may include rendering, in the graphical user interface, the identified portion of the trajectory corridor in a different colour or fill pattern than a remainder of the trajectory corridor. Portions of the trajectory corridor that will likely intersect dynamic obstacles, or that will intersect dynamic obstacles for some time interval, may also be visually emphasized e.g., using another colour or fill pattern.

U.S. Pat. No. 9,375,841B1 shows the use of LED lights of different colours to indicate joint-specific information. The information is indicated during operation of the robot. As an example, a tri-colour LED can be located at each joint to indicate many types of joint-specific information, such as to light up a certain colour to show a joint "effort" to enable operators to easily determine how close the robotic device is to an operating limit.

Visual aids, such as the ones described above, are useful to the programmer or operator of the robot because they provide them with data in a manner that allows them to easily assess whether a program or sequence of the robot is usable or in need of amendments. Thus, there is always a need to provide more ways to assist programmers in programming robots.

SUMMARY

It is an aim of the present invention to provide a system for assisting a user in programming a robot.

This aim is achieved by a device, method and computer program according to the invention.

The disclosure provides a system, for assisting a user in programming a robot comprising a plurality of joints and a Tool Centre Point. The system comprises processing circuitry and storage circuitry and the storage circuitry comprises predefined possible values for a measurable physical condition of at least two joints, the possible values being subdivided into two or more ranges for each of the at least two joints. The processing circuitry is arranged to acquire a first path of the Tool Centre Point, receive, for each of a plurality of points of the first path and for the at least two joints, a value associated with the physical condition of the joint, determine, for each received value, which of said ranges the value is associated with, generate at least one additional path which is parallel to the first path and which has a corresponding plurality of points, associate each of the at least two joints to a respective path of any of the at least one additional path and the first path, and send instructions to a display to illustrate the first path and the at least one additional path, together with the information of which range the values are associated with at the plurality of points of the paths. In other words, for a path of the Tool Centre Point (TCP), the system provides additional paths, which are parallel to the path of the TCP, which are illustrated together with information regarding what range the values for the physical condition are in. By this, it is possible for the programmer to quickly determine if any joints have a physical condition that needs to be adjusted. By assigning the values for specific joints to specific paths, the programmer can easily determine which joint needs to be adjusted. By also illustrating what range the values are associated with at the plurality of points, the programmer can determine where along the path a joint may need to be adjusted.

During programming of a robot, it is difficult to know under how much heavy stress the robot is. If not taken into consideration, during heavy load cycles, the driveline or the structure of the robot can have a reduced lifetime compared to an evenly distributed load. With the above system, the lifetime of the robot may be increased.

According to some aspects, each range is associated with a respective colour and the instructions to the display comprise instructions to illustrate each respective point of the paths in the respective colour. I.e., to illustrate the paths associated with one of the at least two joints in the colour of the range associated with the value of the respective plurality of points of the path. The first path and/or the additional paths are thus illustrated in different colours. The colours are, for example, green—for a range that is considered within normal workings of the respective joints, yellow—for a range that is close to a working limit of the physical condition and red—for a range that is outside of what is considered to be non-damaging for the joints. The paths are thus illustrated in the colours for the specific range of the values at the plurality of points and the user can easily determine where on the path which joint is close to its working limit or outside of its working limit.

According to some aspects, the measurable physical condition is any one or more of: temperature, wear, friction, slip, slide, backlash error, vibration, external disturbance, path accuracy, torque, speed, power consumption, joint angle, and joint force. All of these values can be useful for the user to know if they are approaching a limit for the value at a specific joint or not.

According to some aspects, the processing circuitry is arranged to generate one additional path, which is parallel to the first path, and which has a corresponding plurality of points, for each of the at least two joints. There is thus a first path and one additional path for each joint illustrated. The first path then being un-associated with a joint. The first joint may then, for example, be illustrated in black and the additional paths associated with joints may be illustrated in the colour associated with the range of the value at each point. This may be beneficial in that it is easy for the user to determine which path of the illustrated ones is the first path since the first path is the actual path of the TCP and the additional paths are parallel to the first path but offset from it.

According to some aspects, the processing circuitry is arranged to generate one additional path, which is parallel to the first path, and which has a corresponding plurality of points, for each of the at least two joints but one, one of the at least two joints being associated with the first path. In this case, there is one path for each joint to be illustrated. One joint is thus associated with the first path and the information of which range the values are associated with at the plurality of points of that path is illustrated in connection to the first path. This minimizes the space needed for the visualization.

According to some aspects, the acquiring comprises to receive the first path from a path determining module.

According to some aspects, the acquiring comprises that the processing circuitry is arranged to determine the first path based on at least a start point and an end point.

The first path may thus be determined by the processing circuitry or received from an external source.

According to some aspects, the processing circuitry is arranged to determine, for each received value, which of said ranges the value is associated with, by comparing the received values with the predefined possible values. An efficient way to determine the range is thus provided.

According to some aspects, the processing circuitry is arranged to receive the value associated with the physical condition at the respective points for each joint, and to send instructions, to the display, to illustrate all paths associated with a joint together with the information of which range the values are associated with at the plurality of points of the paths. The system thus provides the user with information regarding the physical condition of each joint of the robot.

The disclosure provides a method, for assisting a user in programming a robot comprising a plurality of joints and a Tool Centre Point. The method comprises:
providing predefined possible values for a measurable physical condition of at least two joints, the possible values being subdivided into two or more ranges for each of the at least two joints,
acquiring a first path of the Tool Centre Point,
receiving, for each of a plurality of points of the first path and for the at least two joints, a value associated with the physical condition of the joint,
determining, for each received value, which of said ranges the value is associated with,
generating at least one additional path which is parallel to the first path, and which has a corresponding plurality of points,
associating each of the at least two joints to a respective path of any of: the at least one additional path and the first path, and
sending instructions to a display, to illustrate the first path and the at least one additional path, together with the information of which range the values are associated with at the plurality of points of the paths.

The method has the same advantages as discussed under the corresponding system above.

The disclosure provides a computer program directly loadable into the internal memory of the computer or a processor, comprising software code portions for performing the steps of the above method when said program is running on one or more computers.

The disclosure provides a computer readable medium having a program recorded thereon, when the program is to make one or more computers perform the steps of the above method, and said program is running on the computer.

BRIEF DESCRIPTION OF THE DRAWINGS

The invention will now be explained more closely by the description of different embodiments of the invention and with reference to the appended figures.

DETAILED DESCRIPTION

Figure 1:
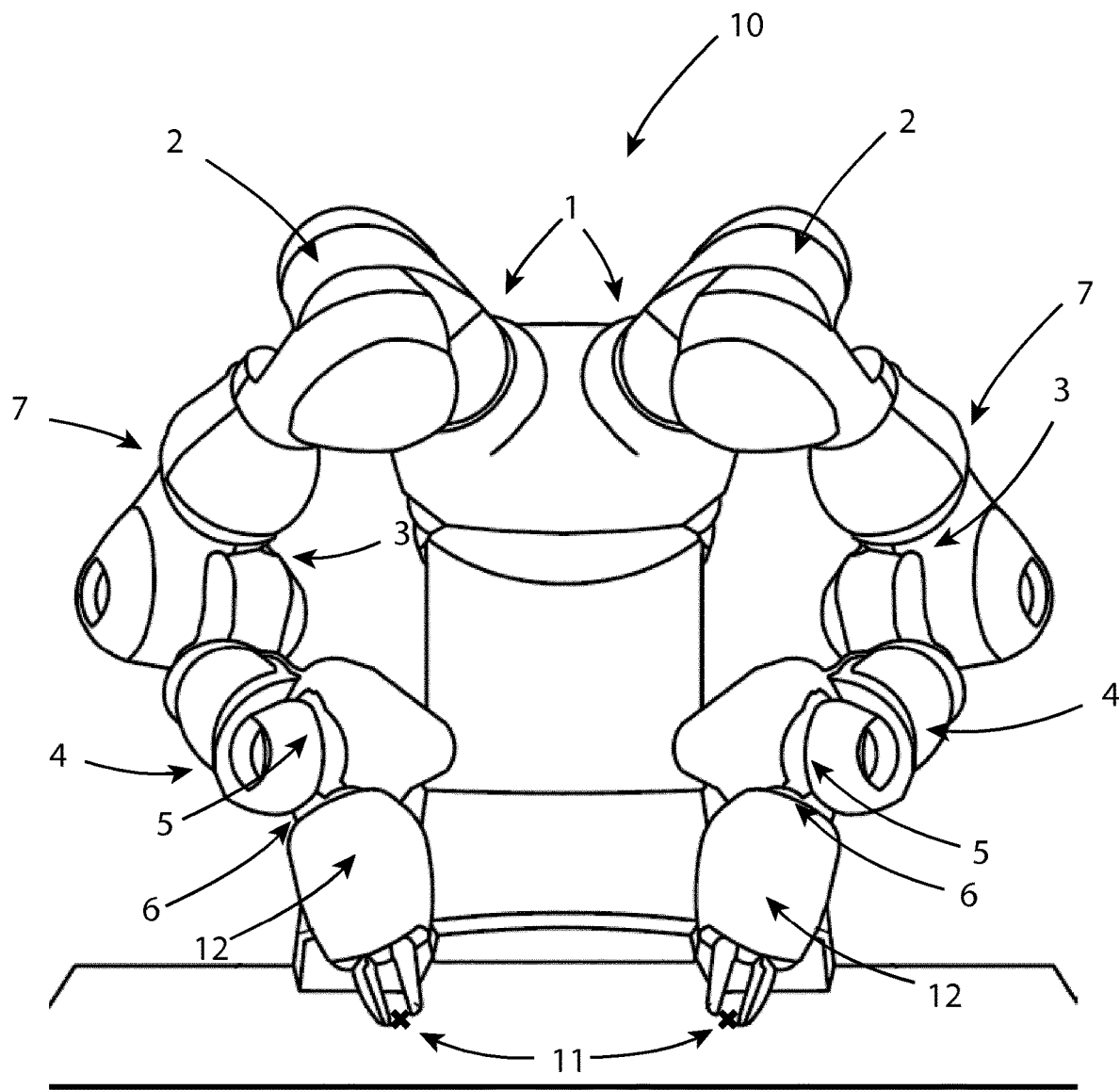
FIG. 1 shows an example of a robot with two arms, each comprising seven joints.

The present invention is not limited to the embodiments disclosed but may be varied and modified within the scope of the following claims. For example, the system may be used with any robot with any number of joints, not only the robot with seven joints illustrated in the figures.

Aspects of the present disclosure will be described more fully hereinafter with reference to the accompanying drawings. The system disclosed herein can, however, be realized in many different forms and should not be construed as being limited to the aspects set forth herein. Like numbers in the drawings refer to like elements throughout.

The terminology used herein is for the purpose of describing particular aspects of the disclosure only and is not intended to limit the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The general idea of the disclosure is to provide a system which assists a user in programming a robot. The system provides a visualizing aid to the programmer by providing and illustrating a path of a Tool Centre Point, TCP, as well as several parallel paths, where the paths are associated with respective joints. The paths are also illustrated together with information regarding the physical conditions of the respective joints at specific points of the paths.

FIG. 1 shows an example of a robot 10 with two arms, each comprising seven joints 1-7. At the joints 1-7 the arms can rotate. The disclosure provides a system for assisting a user in programming a robot 10 comprising a plurality of joints 1-7 and a Tool Centre Point 11. It should be noted that the robots 10 illustrated in the figures has seven joints 1-7 on two separate arms but the disclosure is not limited to such robots 10. The solutions in the disclosure are applicable to any robot with at least one arm and with at least two joints.

The system comprises processing circuitry and storage circuitry. The processing circuitry comprises any kind of processing means capable of performing the below steps. The processing circuitry may be a processor with one or multiple cores and/or may be several processors working together. The storage circuitry is any kind of memory capable of storing information that may be accessed by the processing circuitry. The processing circuitry is thus in communication with the storage circuitry. The storage circuitry is preferably a non-volatile memory such as a Read-Only Memory (ROM), a flash memory, a magnetic computer storage device or an optical storage device.

The storage circuitry comprises predefined possible values for a measurable physical condition of at least two joints 1-7, the possible values being subdivided into two or more ranges for each of the at least two joints 1-7. Predefined here means that the information regarding the possible values has been stored in the storage circuitry before the processing circuitry performs the below steps. The predefined possible values and the ranges may be updated during operation if needed. Examples of measurable physical conditions will be discussed below.

The processing circuitry is arranged to acquire a first path 20 of the Tool Centre Point 11, TCP. It should be noted that the TCP 11 is defined by a tool flange when there is no tool 12 attached to the robot arm. The TCP 11 can be set by the user and is not necessarily a centre point of the tool 12. It is thus up to the user of the system to set the TCP 11. According to some aspects, the acquiring comprises to receive the first path 20 from a path determining module. According to some aspects, the acquiring comprises that the processing circuitry is arranged to determine the first path 20 based on at least a start point and an end point. According to some aspects, the processing circuitry is arranged to determine the first path 20 based also on additional intermediate points or other program instructions. The first path 20 may thus be determined by the processing circuitry or received from an external source.

The processing circuitry is arranged to receive, for each of a plurality of points of the first path 20 and for the at least two joints 1-7, values associated with the physical conditions of the respective joints. The first path 20 has an indefinite amount of points along the path that the TCP 11 passes as it moves along the path. The processing circuitry is arranged to receive values from a plurality of points along the path but not from all since all is an indefinite number. According to some aspects, the user may instruct the processing circuitry how often the processing circuitry is to receive values or at how many points. The points are, according to some aspects, evenly spread along the first path 20. The points may also be more concentrated at more complex movements for the robot 10, such as at a curve of the path. According to some aspects, the measurable physical condition is any one or more of: temperature, wear, friction, slip, slide, backlash error, vibration, external disturbance, path accuracy, torque, speed, power consumption, joint angle and joint force excluding friction and torque. It can be useful for the user to know if any of these values approaches a limit for the value at a specific joint or not. It should be noted that the values may be in the form of margins, i.e. deviations from a desired value.

The processing circuitry is arranged to determine, for each received value, which of said ranges the value is associated with. According to some aspects, the processing circuitry is arranged to determine, for each received value, which of said ranges the value is associated with, by comparing the received values with the predefined possible values.

The plurality of points may, according to some aspects, be variable and depend on which range the received values are associated with. If the range is one that indicates that a joint is close to its limit for a physical condition, the processing circuitry may receive values from said joints 1-7 at points more closely located to each other to more precisely be able to assist the user on when a joint is passing a limit for it.

The processing circuitry is arranged to generate at least one additional path 21-25 which is parallel to the first path 20 and which has a corresponding plurality of points. In other words, the processing circuitry generates, using the first path 20, one or more additional paths which are parallel to the first path 20. The additional paths are thus the same as the first path 20 but offset from it to form parallel paths. If more than one additional path is generated, the offset is different for different additional paths so that the paths avoid overlapping. How much the paths are offset is up to the system designer. It may depend on what kind of screen will be used and in what way the paths are illustrated on a screen.

The processing circuitry is arranged to associate each of the at least two joints 1-7 to a respective path of any of the at least one additional path 21-25 and the first path 20. There are some alternatives to this. For at least two of the joints 1-7 where the processing circuitry has received values at the plurality of points, the joints 1-7 are associated with a path each, either the first path 20 or an additional path 21-25. Alternatively, both of the at least two joints 1-7 are associated with additional paths and the first path 20 is unassigned to any joints. Thus, according to some aspects, the processing circuitry is arranged to generate one additional path 21-25, which is parallel to the first path 20 and which has a corresponding plurality of points, for each of the at least two joints 1-7. There is thus a first path 20 and one additional path 21-25 for each joint to be illustrated, the first path 20 not being associated with a joint. The first path 20 may then be illustrated, for example, in black, and the additional paths 21-25 associated with joints may be illustrated in the colour or colours associated with the range of the value at each point. This may be beneficial in that it is easy for the user to determine which path of the illustrated ones is the first path 20 since the first path 20 is the actual path of the TCP 11 and the additional paths are parallel to the first path 20 but offset from it. According to some aspects, the processing circuitry is arranged to generate one additional path 21-25, which is parallel to the first path 20 and which has a corresponding plurality of points, for each of the at least two joints 1-7 but one, one of the at least two joints 1-7 being associated with the first path 20. In this case, there is one path for each joint to be illustrated. One joint is thus associated with the first path 20 and the information about which range the values are associated with at the plurality of points of that path is illustrated in connection to the first path 20. This minimizes the space needed for the visualization.

It should be noted that there can be more paths than the robot number of joints. Of the physical conditions listed above: temperature, wear, friction, slip, slide, backlash error, vibration, external disturbance, path accuracy, torque, speed, power consumption, joint angle, and joint force, one or more is the measurable physical condition to be illustrated. If two physical conditions are to be illustrated, the processing circuitry generates two paths for each joint. In other words, the number of paths depends on the number of measurable physical conditions to be illustrated to the user. Which paths to generate and for which physical condition may be up to the user to choose.

The processing circuitry is arranged to send instructions, to a display, to illustrate the first path 20 and the at least one additional path 21-25, together with the information about which range the values are associated with at the plurality of points of the paths. In other words, for a path of the TCP 11, the system provides additional paths, which are parallel to the path of the TCP 11, which are illustrated together with information regarding what range the values for the physical condition are in. By this, it is possible for the programmer to quickly determine if any joints 1-7 have a physical condition that needs to be adjusted. By assigning the values for specific joints 1-7 to specific paths, the programmer can easily determine which joint needs to be adjusted. By also illustrating what range the values are associated with at the plurality of points, the programmer can determine where along the path a joint may need to be adjusted.

Figure 2:
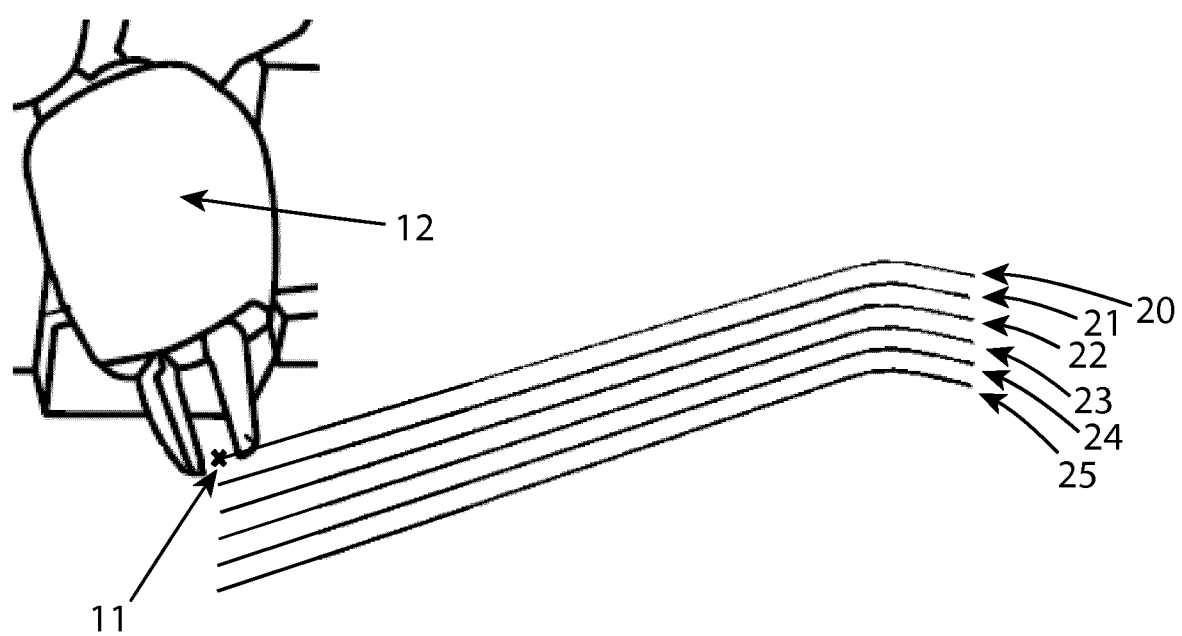
FIG. 2 shows a close-up view of a tool of an example robot and with six parallel paths, one path for the TCP and five additional paths to show physical conditions of respective joints.

FIG. 2 illustrates a close-up view of a tool 12 of an example robot and with six parallel paths, one path 20 for the TCP 11 and five additional paths 21-25 to show a physical condition of respective joints 1-7. As can be seen in the figure, the additional paths 21-25 are parallel to the first path 20 and offset from each other such that they are all parallel to each other without overlapping.

During programming of a robot, it is difficult to know under how much stress the robot is under. If not taken into consideration, during heavy load cycles, the driveline or the structure of the robot can have a reduced lifetime compared to an evenly distributed load. With the disclosed system, the lifetime of the robot may be increased. This disclosure introduces a visualization tool visualizing physical conditions of joints 1-7 so that it is easier to analyse the impact of different paths of the TCP on different joints.

There are several ways to illustrate the paths together with the information about which range the values are associated with at the plurality of points of the paths. It could, for example, be illustrated as text in boxes in connection with the point associated with the illustrated value. It could, for example, be illustrated as flags with the information or range bars illustrating where in the range the value is. According to some aspects, each range is associated with a respective colour and the instructions to the display comprise instructions to illustrate each respective point of the paths in the respective colour. That is, the instructions to the display comprise instructions to illustrate the paths associated with one of the at least two joints 1-7 in the colours of the ranges associated with the value of the respective plurality of points of the path. The first path 20 and/or the additional paths are thus illustrated in different colours. The colours are, for example, green—for a range that is considered within normal workings of the respective joints 1-7, yellow—for a range that is close to a working limit of the physical condition and red—for a range that is outside of what is considered to be non-damaging for the joints 1-7. The paths are thus illustrated in the colours for the specific range of the values at the plurality of points and the user can easily determine where on the path and which joint is close to its working limit or outside of its working limit. According to some aspects, each range is associated with a respective style of the line, such as dotted, dashed, dash-dotted or dotted with different spacing, and the instructions to the display comprise instructions to illustrate each respective point of the paths in the respective line style. That is, the instructions to the display comprise instructions to illustrate the paths associated with one of the at least two joints 1-7 in the line style of the range associated with the value of the respective plurality of points of the path.

FIG. 2 is illustrated in black and white but with the colour representation, the different lines shown in the figure would be of different colours at different places to indicate what range the values for the respective joints 1-7 are associated with.

It should be noted that the ranges that the possible values are subdivided into may comprise so many ranges with associated colours so that the colours illustrated on the paths are a gradient of colours. In other words, the number of ranges may be so many that a gradual effect of the colouring of the path can be achieved. The number of ranges is at least two but has no theoretical upper limit.

The number of joints 1-7 from which the processing circuitry receives values are at least two. It may be that the system is used for only some of the joints 1-7 of a robot 10.

Some joints 1-7 may be subjected to more forces than others and are thus more important to keep track of. It may also be that the system is used for all joints 1-7 of a robot 10. According to some aspects, the processing circuitry is arranged to receive the value associated with the physical condition at the respective points for each joint 1-7, and to send instructions, to the display, to illustrate all paths associated with a joint together with the information of which range the values are associated with at the plurality of points of the paths. The system thus provides the user with information regarding the physical condition of each joint of the robot 10.

Figure 3:
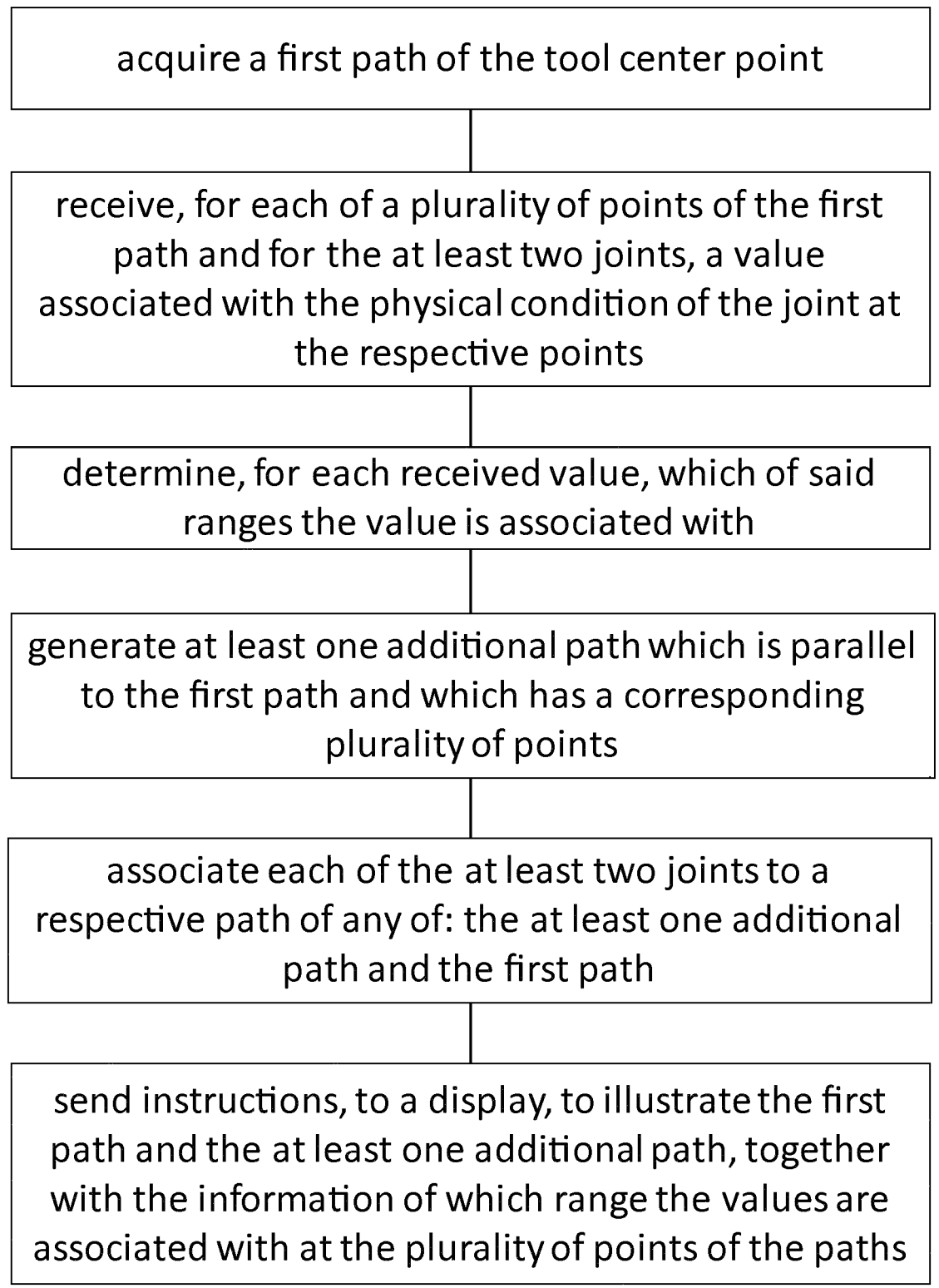
FIG. 3 shows a block diagram for the steps performed by the processing circuitry.

FIG. 3 shows a block diagram for what the processing circuitry is arranged to perform according to the widest aspects of the disclosure. It should be noted that all tasks may be executed one or more times. The tasks are, according to some aspects, executed multiple times as the robot 10 moves along the first path 20 and passes each of the plurality of points. For example, the acquisition of a first path 20 may involve acquiring a whole first path 20 in one go, or to continuously acquiring new points of the first path 20 as the TCP 11 moves along the path (either in simulation or in a real operation). If new points are continuously received, the additional paths are also continuously generated to correspond to the received points. If the processing circuitry acquires the whole first path 20 in one go, the generation of additional paths may also be done in one go. The sending of instructions to a display may be done as soon as the robot 10 has moved the whole first path 20 (in simulation or in a real operation), or it may be done as soon as new values have been received and associated with a range. The determining may be done as soon as a value has been received or when a predetermined amount of values has been received.

The block diagram of FIG. 3 illustrates the steps of a method, for assisting a user in programming a robot comprising a plurality of joints and a TCP. The method comprises:
  providing predefined possible values for a measurable physical condition of at least two joints, the possible values being subdivided into two or more ranges for each of the at least two joints,
  acquiring a first path of the TCP, receiving, for each of a plurality of points of the first path and for the at least two joints, a value associated with the physical condition of the joint at the respective points,
  determining, for each received value, which of said ranges the value is associated with,
  generating at least one additional path which is parallel to the first path, and which has a corresponding plurality of points,
  associating each of the at least two joints to a respective path of any of: the at least one additional path and the first path, and
  sending instructions to a display, to illustrate the first path and the at least one additional path, together with the information of which range the values are associated with at the plurality of points of the paths.

The method has the same advantages as discussed under the corresponding system above.

It is easy to realize that the method according to the invention, as defined in the appended set of method claim, is suitable for execution by a computer program having instructions corresponding to the steps in the method when running processing circuitry. The computer program product is provided either on a computer readable medium or through a network, such as the Internet. The computer program may be directly loadable into the internal memory of the computer or a processor, comprising software code portions for performing the steps of the above method when said program is running on one or more computers. A computer readable medium having a program recorded thereon may be provided, where the program is to make one or more computers perform the steps of the above method, and said program is running on the computer.

Figure 4:
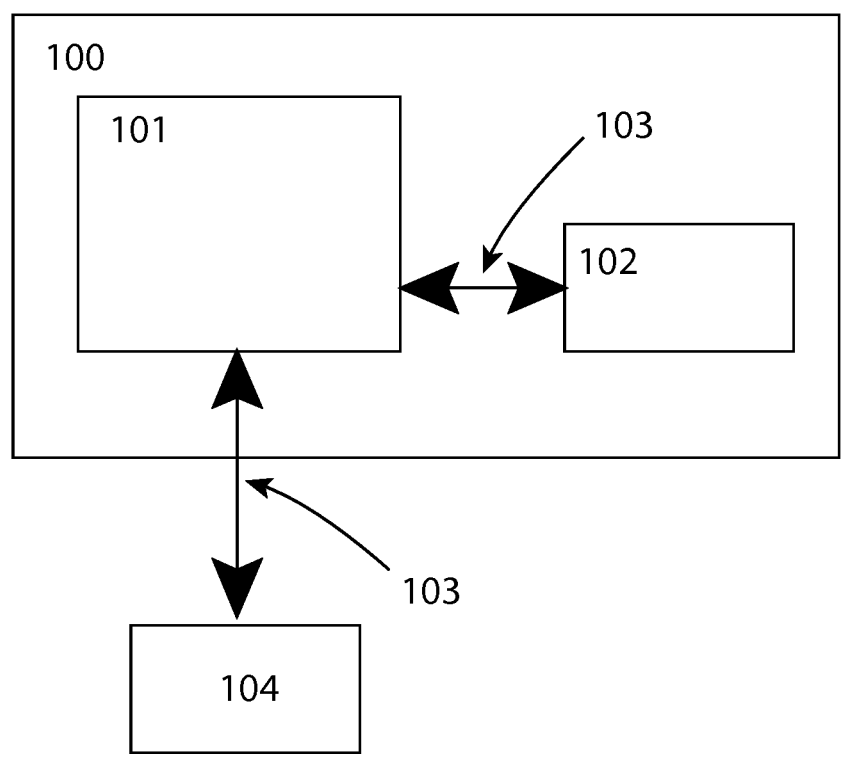
FIG. 4 shows an example system.

An example system 100 is illustrated as a schematic block diagram in FIG. 4. The system 100 comprises processing circuitry 101 and storage circuitry 102. The system also comprises some communication circuitry 103 to communicate with a display 104. The way to communicate may either be by wire or by wireless communication. Communication means between a display and processing means are known to the skilled person and will therefore not be discussed here.

The invention claimed is:

1. A system, for assisting a user in programming a robot comprising a plurality of joints and a Tool Centre Point, the system comprising processing circuitry and storage circuitry, the storage circuitry includes predefined possible values for a measurable physical condition of at least two joints, the possible values being subdivided into two or more ranges for each of the at least two joints, and wherein the processing circuitry is arranged to:
   acquire a first path of the Tool Centre Point,
   receive, for each of a plurality of points of the first path and for the at least two joints, a value associated with the physical condition of the joint,
   determine, for each received value, which of said ranges the value is associated with,
   generate at least one additional path which is parallel to the first path and which has a corresponding plurality of points,
   associate each of the at least two joints to a respective path of any of the at least one additional path and the first path, and
   send instructions to a display, to illustrate the first path and the at least one additional path, together with the information of which range the values are associated with at the plurality of points of the paths.

2. The system according to claim 1, wherein each range is associated with a respective colour and the instructions to the display include instructions to illustrate each respective point of the paths in the respective colour.

3. The system according to claim 1, wherein the measurable physical condition is any one or more of: temperature, wear, friction, slip, slide, backlash error, vibration, external disturbance, path accuracy, torque, speed, power consumption, joint angle, and joint force.

4. The system according to claim 1, wherein the processing circuitry is arranged to generate one additional path, which is parallel to the first path and which has a corresponding plurality of points, for each of the at least two joints.

5. The system according to claim 1, wherein the processing circuitry is arranged to generate one additional path, which is parallel to the first path and which has a corresponding plurality of points, for each of the at least two joints but one, one of the at least two joints being associated with the first path.

6. The system according to claim 1, wherein the acquiring comprises to receive the first path from a path determining module.

7. The system according to claim 1, wherein the acquiring comprises that the processing circuitry is arranged to determine the first path based on at least a start point and an end point.

8. The system according to claim 1, wherein the processing circuitry is arranged to determine, for each received value, which of said ranges the value is associated with, by comparing the received values with the predefined possible values.

9. The system according to claim 1, wherein the processing circuitry is arranged to receive the value associated with the physical condition at the respective points for each joint, and to send instructions, to the display, to illustrate all paths associated with a joint together with the information of which range the values are associated with at the plurality of points of the paths.

10. A method for assisting a user in programming a robot comprising a plurality of joints and a Tool Centre Point, wherein the method comprises:
    providing predefined possible values for a measurable physical condition of at least two joints, the possible values being subdivided into two or more ranges for each of the at least two joints,
    acquiring a first path of the Tool Centre Point,
    receiving, for each of a plurality of points of the first path and for the at least two joints, a value associated with the physical condition of the joint,
    determining, for each received value, which of said ranges the value is associated with,
    generating at least one additional path which is parallel to the first path and which has a corresponding plurality of points,
    associating each of the at least two joints to a respective path of any of: the at least one additional path and the first path, and
    sending instructions to a display, to illustrate the first path and the at least one additional path, together with the information of which range the values are associated with at the plurality of points of the paths.

11. A computer program directly loadable into the internal memory of the computer or a processor, comprising software code portions for performing the steps of a method when said program is running on one or more computers, the method including the steps:
    providing predefined possible values for a measurable physical condition of at least two joints, the possible values being subdivided into two or more ranges for each of the at least two joints,
    acquiring a first path of the Tool Centre Point,
    receiving, for each of a plurality of points of the first path and for the at least two joints, a value associated with the physical condition of the joint,
    determining, for each received value, which of said ranges the value is associated with,
    generating at least one additional path which is parallel to the first path and which has a corresponding plurality of points,
    associating each of the at least two joints to a respective path of any of: the at least one additional path and the first path, and
    sending instructions to a display, to illustrate the first path and the at least one additional path, together with the information of which range the values are associated with at the plurality of points of the paths.

12. A computer readable medium having a program recorded thereon to make one or more computers perform the steps of a method when said program is running on the computer, the steps comprising:
    providing predefined possible values for a measurable physical condition of at least two joints, the possible values being subdivided into two or more ranges for each of the at least two joints, acquiring a first path of the Tool Centre Point, receiving, for each of a plurality of points of the first path and for the at least two joints, a value associated with the physical condition of the joint, determining, for each received value, which of said ranges the value is associated with, generating at least one additional path which is parallel to the first path and which has a corresponding plurality of points, associating each of the at least two joints to a respective path of any of: the at least one additional path and the first path, and sending instructions to a display, to illustrate the first path and the at least one additional path, together with the information of which range the values are associated with at the plurality of points of the paths.

13. The system according to claim 2, wherein the measurable physical condition is any one or more of: temperature, wear, friction, slip, slide, backlash error, vibration, external disturbance, path accuracy, torque, speed, power consumption, joint angle, and joint force.

14. The system according to claim 2, wherein the processing circuitry is arranged to generate one additional path, which is parallel to the first path and which has a corresponding plurality of points, for each of the at least two joints.

15. The system according to claim 2, wherein the processing circuitry is arranged to generate one additional path, which is parallel to the first path and which has a corresponding plurality of points, for each of the at least two joints but one, one of the at least two joints being associated with the first path.

16. The system according to claim 2, wherein the acquiring comprises to receive the first path from a path determining module.

* * * * *